April 18, 1950     C. CROSS     2,504,395
APPARATUS FOR TESTING ARMATURES
Filed Dec. 21, 1943
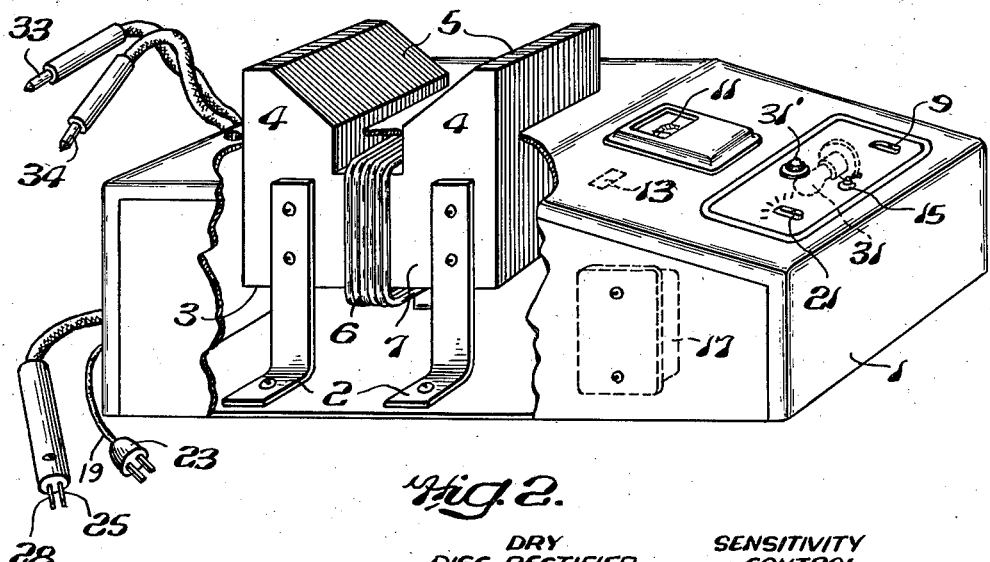
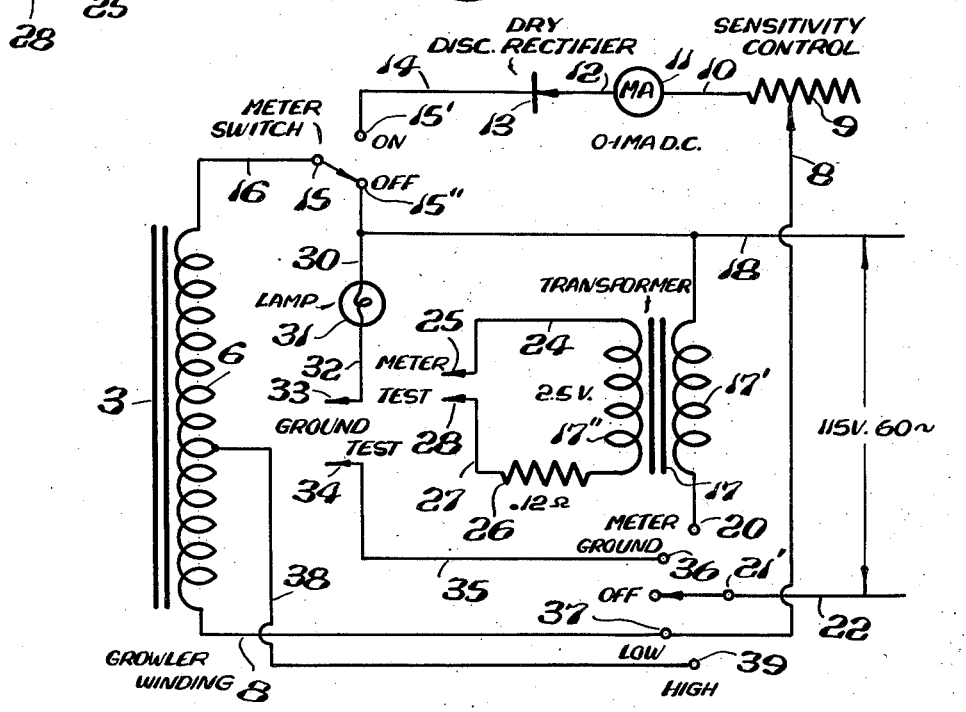
INVENTOR.
Charles Cross
BY
ATTORNEY.

Patented Apr. 18, 1950

2,504,395

UNITED STATES PATENT OFFICE 2,504,395

APPARATUS FOR TESTING ARMATURES

Charles Cross, Philadelphia, Pa., assignor, by mesne assignments, to Lanagan and Hoke, Inc., Philadelphia, Pa., a corporation of Pennsylvania Application December 21, 1943, Serial No. 515,092

1 Claim. (Cl. 175—183)

My invention is an improved apparatus for testing armatures, and particularly for testing D. C. armatures having equipotential connections which act as short circuits, causing excessive current flows and overheating and preventing accurate indication when such equipotential armatures are tested in the usual manner.

My improvements provide an improved tester by which armatures having equipotential connections, or armatures having standard types of connections, may be quickly and accurately tested for short circuits, grounds, opens and high resistance contacts.

In accordance with my invention, the testing of an armature, with equipotential or standard connections, is effected by supplying low voltage alternating current to the armature windings in succession and inducing thereby a current in a conductor or coil in inductive proximity to the armature winding and measuring the thus induced current. As used herein, the term "inductive current" means a current which is capable of inducing a pulsating flux when applied to an inductive winding. The induced current may be measured directly on an alternating current meter, but preferably the induced current is rectified and the rectified current measured on a direct current milli-ampere meter. The reading on the meter may be adjusted by means of a rheostat or sensitivity control in series therewith which permits the meter indication to be adjusted to full scale, so as to produce a large difference in meter reading for "shorts" in one turn.

In the preferred embodiment of my invention, low voltage alternating current is supplied from a transformer to the armature windings while the armature rests upon a seat formed by the beveled legs of a laminated iron core on which is wound a coil in series circuit with the rectifying and measuring devices. Preferably there is included in the apparatus switching and other mechanisms by which the current rectifying and measuring devices may be disconnected from the coil and current of high voltage supplied to the coil on the core to induce current in the armature windings for other types of tests. There may, if desired, also be provided means in series circuit with a lamp or other signal for supplying current to commutator segments of the armature to determine the existence of grounds between the windings and core of the armature.

By my improvements, sufficient current may be supplied to a winding being tested to indicate a high resistance connection, the magnetic drag between the armature and its seat is minimized so that the armature may be easily turned on its seat, the presence of a short in even one turn of the armature is indicated by a large variation in the meter reading, the meter can be adjusted to give full scale reading, and excessive current flows and overheating in equipotential type armatures is avoided.

The characteristics and advantages of my improvements will further appear from the following description and the accompanying drawings of an illustrative embodiment thereof.

In the drawings, Fig. 1 is a perspective view of an armature tester embodying my invention, with parts broken away to show the interior construction; and Fig. 2 is a schematic diagram of the apparatus shown in Fig. 1.

In the embodiment of my invention illustrated in the drawings, a metal case or housing 1 has mounted therein the brackets 2 supporting a substantially U-shaped core 3 having beveled legs 4 projecting through the top of the housing and forming a concave seat 5 for an armature to be tested (not shown). A coil 6, comprising a plurality of turns of insulated wire is wound around the bight or web 7 of the core 3 transversely to the laminations thereof and between the legs 4.

The coil 6 forms part of a circuit comprising the series connected conductor 8, the adjustable rheostat or sensitivity control 9, the conductor 10, the D. C. milliampere meter 11 having conventional externally accessible means for adjusting the pointer to datum position, the conductor 12, the dry disk rectifier 13, the conductor 14, the switch point 15' of the switch 15, and the conductor 16 connecting the switch 15 with the opposite end of the coil from the conductor 8. A transformer 17 is fixed in the housing 1 and has its primary coil 17' connected with a flexible conductor 18 of a supply cord 19 and with a terminal or switch point 20 of a multi-point main selector switch 21. The switch 21 has a terminal 21' connected with the conductor 22 of the cord 19 and selectively connectable with any of the switch points by a blade 21".

The conductors 18 and 22 of the cord 19 are connected with prongs of a plug 23 by which the apparatus may be connected with any suitable source of alternating current of normal voltage and frequencies, say 115 volts, 60 cycles.

The transformer 17 is so wound as to reduce the output of its secondary coil 17" to say 2.5 volts. One end of this secondary coil 17" is connected, through a conductor 24, with a test prod 25, and the other end is connected, through a fixed resistor 26 (of, say, .12 ohms) and conductor 27, with the complementary test prod 28.

In testing an armature for short or open circuits in its windings in accordance with my invention, the armature is placed on the seat 5, the switch 15 is closed to complete the meter circuit, and the switch 21 is turned so as to supply current from the line to the transformer 17.

The pair of test prods 25 and 28 are then brought successively into contact with commutator segments of the stationary armature to supply to each winding individually low voltage alternating current sufficient to show up high resistance contacts or other defects. The current flow through the armature winding, if any, induces a voltage in the coil 6, and the resulting current flowing through the meter circuit is rectified by the rectifier 13 and deflects the indicator of the D. C. 0–1 ma. meter 11.

When the pair of contacts giving the highest meter reading has been ascertained by successively touching the commutator segments while the armature is stationary, the position of the prods is noted and the meter 11 is adjusted by means of the rheostat or sensitivity control 9 to give an approximately full scale deflection of the meter pointer with the prods in the position giving maximum reading. With the prods in such position, the armature may be rotated on its seat. The meter readings for each pair of complementary segments should be approximately uniform and any substantial deviation is indicative of some defect or abnormality in the proximate winding. A short in even one turn or winding of the armature will cause a considerable variation in the meter reading.

To render the apparatus suitable for visual tests of shorts between a winding and core of an armature an incandescent lamp 31 may be connected with the conductor 18 through a conductor 30.

The incandescent lamp, or other signal 31 is connected in series, through a conductor 32, with a test prod 33 and light therefrom shines through a "jewel" 31'. A complementary test prod 34 is connected, through a conductor 35, with a terminal or switch point 36 of the switch 21 so that the prod 34 may be connected, through the switch blade 21", with the line terminal 21'.

With the switching mechanisms positioned to cut the transformer 17 and the meter 11 and its appurtenances out of circuit and connect the prods 33 and 34 with the current source, a standard type of armature on the seat 5 may be visually tested for grounds between the winding and core of the armature by bringing the test prod 33 into contact with the armature core and the prod 34 into contact with the commutator. If the test lamp 31 lights, this indicates that the armature is grounded.

The apparatus may also be equipped for standard tests of standard armatures by providing the selector switch 21 with a switch point 37 connected with the conductor 8 and with a switch point 39 connected through the conductor 38 with an intermediate loop of the coil 6. The switch 15 is provided with a switch point 15" so that the conductor 16 may be connected with the conductor 18.

By closing the switch 15 on the switch point 15" and closing the switch 21 on either switch point 37 or 39, a relatively high voltage alternating current may be sent through the coil 6, the double type winding being provided to secure an appropriate current flow for testing various size armatures. Whether the switch 21 is closed on the point 37 or on the point 39 will depend on the size of the armature being tested.

The relatively high voltage alternating current flowing in the coil 6 produces an alternating flux which flows through the core and induces an e. m. f. in the windings of an armature having standard connections. If the winding is correct, no current will flow, but if a winding is short-circuited, current will flow in the short-circuited turns. Such local current will generate sufficient magnetic flux to attract a hacksaw blade or other like strip of magnetizable material held in close proximity thereto and thereby indicates the defective winding. Armatures having equipotential connections cannot be effectively tested in this manner since the equipotential connections act as a short-circuit on the winding.

Having described my invention, I claim:

An armature testing apparatus comprising a substantially U-shaped core having legs with diverging surfaces forming a seat for an armature therebetween; a circuit including a coil wound on said core and a meter in series with said coil, a low voltage, step-down transformer adjacent to said core and having a secondary provided with contacts flexibly connected therewith and movable successively into conducting relation with a series of turns of an armature supported by said seat in inductive relation to said coil, said seat supporting said armature with its axis in fixed radial relation to said coil, a signal, a switch for connecting said coil with said meter or signal in alternation, a prod connected with said signal and movable into contacting relation with an armature on said seat, a complementary prod movable into conducting relation with an armature on said seat, and a switch having a line terminal and a blade connecting said line terminal with either said second named prod or with said transformer and signal.

CHARLES CROSS.

REFERENCES CITED

The following references are of record in the file of this patent:

UNITED STATES PATENTS

| Number | Name | Date |
| --- | --- | --- |
| 1,254,288 | Stewart | Jan. 22, 1918 |
| 1,276,304 | Zeek | Aug. 20, 1918 |
| 1,373,383 | Couch | Mar. 29, 1921 |
| 1,479,284 | Cullin | Jan. 1, 1924 |
| 1,715,446 | Bossart | June 4, 1929 |
| 1,792,320 | Peters et al. | Feb. 10, 1931 |

FOREIGN PATENTS

| Number | Country | Date |
| --- | --- | --- |
| 354,061 | Germany | May 31, 1922 |